Sept. 19, 1939.   F. W. JACKMAN   2,173,518

PHOTOGRAPHY

Original Filed April 4, 1936

INVENTOR.
FRED W. JACKMAN
BY W. E. Beatty
ATTORNEY.

Patented Sept. 19, 1939

2,173,518

UNITED STATES PATENT OFFICE 2,173,518

PHOTOGRAPHY

Fred W. Jackman, Beverly Hills, Calif., assignor to Warner Bros. Pictures, Inc., New York, N. Y., a corporation of Delaware Original application April 4, 1936, Serial No. 72,735. Divided and this application April 9, 1937, Serial No. 135,983

2 Claims. (Cl. 88—16)

This invention relates to the art of photography and has particular reference to a method of producing trick films.

This is a divisional application of application Serial No. 72,735, filed April 4, 1936 for "Double camera".

One object of the present invention is to show successive tonal changes of a scene, particularly the action components of the scene, on a motion picture film while preserving the continuity of the action. This is accomplished by simultaneously photographing the scene upon a pair of motion picture films from effectively the same point of view while interposing a color filter between at least one of the films and the scene being photographed so as to obtain two films having pictures of identical size and shape but of different tonal values. In a subsequent cutting operation the selected portion of one film is intercut or substituted for a corresponding portion of another film. Preferably the object or scene being photographed is in two complementary colors, in which case each film will have in front thereof a color filter complementary to one of said complementary colors.

Referring to the accompanying drawing, Fig. 1 is a diagrammatic plan view of an arrangement for producing trick pictures in accordance with the present invention.

Figure 1:
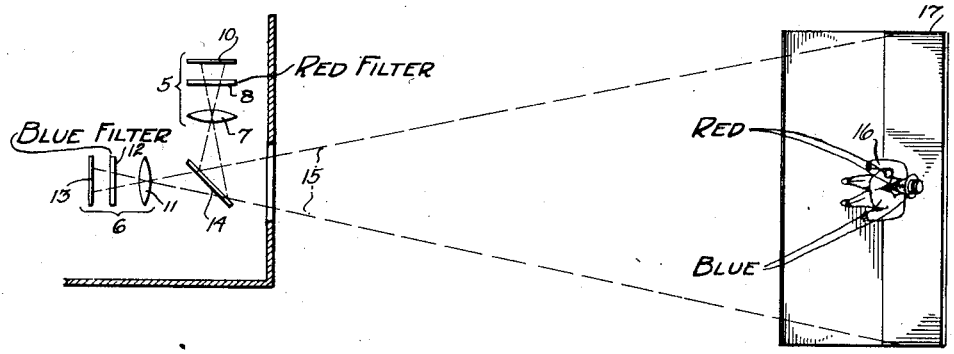
Figures 2, 3, 4:
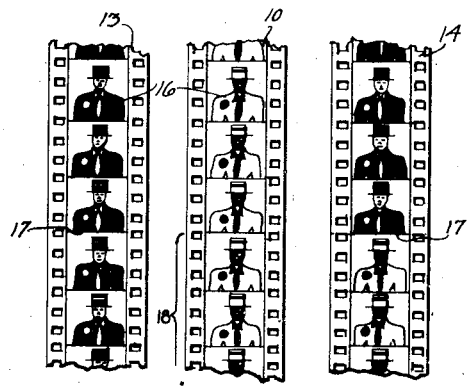
Figs. 2 and 3 show sections of developed film which were exposed in a double camera arrangement shown in Fig. 1.
Fig. 4 shows a composite film produced from the films shown in Figs. 2 and 3.

Referring now to Fig. 1, the double camera arrangement comprises two cinematographic camera units diagrammatically indicated at 5 and 6 having their optical axes intersecting each other at right angles.

The camera unit 5 comprises an objective lens 7, a filter 8 adapted to absorb substantially all but red colored light rays passing therethrough, and a light sensitive cinematographic film 10 obviously sensitive to red light. The camera unit 6 comprises an objective lens 11, a filter 12 adapted to absorb substantially all but blue colored rays of light passing therethrough, and a light sensitive cinematographic film 13 obviously sensitive to blue light. Suitable pull down mechanisms, well known in the art, (not shown) are provided to synchronously and intermittently move the films 10 and 13 across the optical axes of the respective camera units 5 and 6.

A semi-transparent mirror 14 is positioned at the intersection of the optical axes of camera units 5 and 6 and bisects the angle formed by these two axes to reflect a portion of the image beam 15 incident thereon through the lens 7 of camera 5 while permitting a substantially equal portion of the image beam 15 to be transmitted therethrough into the lens 11 of camera unit 6.

The position of the camera units 5 and 6 and the semi-transparent mirror 14, and the adjustment of the lenses 7 and 11 are such that images of identical size and shape but of different tonal values are simultaneously impressed upon the two films 10 and 13.

The action to be photographed is shown by way of example as an actor 16 who performs before a plain, nonactinic backing 17 in the field of the image rays 15. The actor 16 may be illuminated by lamps (not shown) while being photographed.

The actor is arranged in two complementary colors, namely, red and blue, corresponding to the red and blue filters 8 and 12 respectively. For example, the actor's face and a boutonniere or similar object worn by him may be colored red, while his coat and hat may be colored blue.

When the double camera unit is operated to photograph the action or actor 16, the films 10 and 13 are exposed in synchronism so that the film 10 will have exposed thereon only those portions of the actor or action which have been colored red, while the film 13 will have exposed thereon only those portions of the actor or action which have been colored blue. Thus, two films of the same sequence of kinematic phases of action will be obtained having complementary tonal values thereon.

The film 13 at a certain point in the action, for example, at 17 may be intercut at the same point on the action with a corresponding successive portion 18 of the film 10. This intercutting will produce a film 14 showing successive kinematic phases of part of the action having a certain tonal or color value followed by successive kinematic phases of the rest of the action wherein the tonal or color values are different. Thus, continuity of action is preserved in film 14 while providing for an interruption or sudden change in the tonal values thereof.

Although it is preferable to employ two different filters in the two camera units or cameras, respectively, the above mentioned tonal or color change may also be accomplished by photographing with a filter in one camera and without a filter in the other. Desired portions of either film may then be intercut at corresponding points as hereinbefore described.

I claim:

1. The method of producing a cinematographic picture showing a tonal change of successive kinematic phases of action which comprises arranging portions of said action in different colors, simultaneously photographing said action upon two cinematographic films while suppressing the color value of one of said different colors as photographed upon one of said films, and preparing a cinematographic picture by conjoining successive images of a portion of said action on one of said films wherein said color value is suppressed with successive images of a succeeding portion of said action on the other of said films wherein said color value is not suppressed.

2. The method of producing a cinematographic picture showing a tonal change of successive kinematic phases of action which comprises arranging said action in complementary colors, simultaneously photographing said action upon two cinematographic films while suppressing one of said colors as photographed on one of said films and suppressing the other of said colors as photographed on the other of said films, and preparing a cinematographic picture by conjoining successive images of a portion of said action on one of said films wherein one of said color values is suppressed with successive images of a succeeding portion of said action on the other of said films wherein the other of said color values is suppressed.

FRED W. JACKMAN.